United States Patent [19]
Kusaka et al.

[11] Patent Number: 5,460,584
[45] Date of Patent: Oct. 24, 1995

[54] METHOD OF CONTROLLING A LOCK-UP CLUTCH DURING DOWN-SHIFTING OF HYDRAULIC-ACTUATED TYPE MULTI-STEP TRANSMISSION

[75] Inventors: Kohei Kusaka; Yasunori Ohkura, both of Kanagawa, Japan

[73] Assignee: Kabushiki Kaisha Komatsu Seisakusho, Japan

[21] Appl. No.: 134,880

[22] Filed: Oct. 12, 1993

Related U.S. Application Data

[63] Continuation of Ser. No. 862,752, Jul. 8, 1992, abandoned.

[30] Foreign Application Priority Data

Dec. 26, 1989 [JP] Japan ................................. 1-334972
Dec. 26, 1990 [WO] WIPO ................. PCT/JP90/01712

[51] Int. Cl.[6] ....................... F16H 61/14; F16H 59/54
[52] U.S. Cl. ...................... 477/169; 477/174; 477/139
[58] Field of Search ................... 74/882, 890; 192/3.3, 192/3.31, 3.58; 477/132, 139, 140, 169, 174, 118

[56] References Cited

U.S. PATENT DOCUMENTS

| | | | |
|---|---|---|---|
| 4,027,554 | 6/1977 | Ito et al. ........................... | 192/3.58 X |
| 4,438,665 | 3/1984 | Schmidt ............................. | 74/890 X |
| 4,495,576 | 1/1985 | Ito .................................. | 74/890 X |

FOREIGN PATENT DOCUMENTS

| | | | |
|---|---|---|---|
| 0394498 | 10/1990 | European Pat. Off. . | |
| 56-44312 | 10/1981 | Japan ........................... | F16H 47/06 |
| 60-179566 | 9/1985 | Japan ........................... | 74/890 |
| 1-145467 | 6/1989 | Japan ........................... | 74/890 |
| 402129459 | 5/1990 | Japan ........................... | 477/169 |
| 402120565 | 5/1990 | Japan ........................... | 477/169 |
| 402154860 | 6/1990 | Japan ........................... | 477/169 |
| 402236056 | 9/1990 | Japan ........................... | 477/118 |
| 402278069 | 11/1990 | Japan ........................... | 477/118 |
| 405071637 | 3/1993 | Japan ........................... | 477/174 |

*Primary Examiner*—Dirk Wright
*Assistant Examiner*—Khoi O. Ta
*Attorney, Agent, or Firm*—Ronald P. Kananen

[57] ABSTRACT

A hydraulically-actuated multi-step transmission is adapted to prevent the occurrence of engagement shocks of a direct-coupled or lock-up clutch associated with a torque converter. Downshifting is carried out once with the direct-coupled clutch (8) engaged when the vehicle is slowed toward a stop. This is followed by a further downshift with the accelerator released and the direct-coupled clutch disengaged.

12 Claims, 6 Drawing Sheets

METHOD OF CONTROLLING A LOCK-UP CLUTCH DURING DOWN-SHIFTING OF HYDRAULIC-ACTUATED TYPE MULTI-STEP TRANSMISSION

This application is a continuation of application Ser. No. 07/862,752 filed Jul. 8, 1992, now abandoned.

BACKGROUND OF THE INVENTION

1. Field of the Invention

The present invention relates to a method of controlling the shifting of a hydraulically-actuated type multi-step transmission for use on a large-sized construction vehicle and the like.

2. Description of the Prior Art

A hydraulically-actuated multi-step transmissions which are equipped with a plurality of hydraulic clutches and gear trains and wherein a shift can be made to a desired speed gear by engaging a specific hydraulic clutch or clutches, are known.

These type of hydraulically-actuated multi-step transmission are used in combination with a torque converter for increasing the maximum tractive power during vehicle starts.

On the other hand, since a large-sized construction vehicle, such as a large-sized dump truck, requires a large amount of torque for high-speed traveling, a torque converter having a direct-coupled or lock-up clutch is provided. In these type of arrangements the pump and turbine of the torque converter can be selectively connected by the direct-coupled clutch for efficient transmission of large amounts of torque. During shifting, however, the direct-coupled clutch is disengaged for reducing the load of the hydraulic clutches of the transmission. After the shift is concluded, the direct-coupled clutch is re-engaged.

That is to say, if a shift is made with the direct-coupled clutch left engaged, a great load is exerted on at least one of the hydraulic clutches of the transmission, resulting in the generation of severe shift shock. During shifting, therefore, the direct-coupled clutch is disengaged to lessen the load applied to the hydraulic clutches, thereby decreasing the shift shock.

Increasing the capacity of the hydraulic clutches of the transmission can decrease, to some degree, the effect of the load acting thereon during operation. However, the transmission incorporating hydraulic clutches of increased capacity become large in size and costly.

According to this method of controlling speed changes, however, there occur both a shift shock during shifting due to the engagement of the hydraulic clutches and an engagement shock at the time of engagement of the direct-coupled clutch. This increases the amount of shock at the time of shifting, and causes the driver discomfort.

A markedly great engagement shock is produced when the direct-coupled clutch is engaged and the transmission is conditioned to produce low gear.

SUMMARY OF THE INVENTION

The present invention has been proposed in view of the above-mentioned problems and has as its object the provision of a method for controlling the shifting of a hydraulic-actuated multi-step transmission in which no engagement shock will occur at the time of engagement of a direct-coupled clutch of a torque converter.

To attain the above-described object, the present invention provides a method of controlling the shifting of the hydraulic-actuated type multi-step transmission comprising the steps of: automatically shifting down once from a high speed to a low speed with the direct-coupled clutch of the torque converter held in an engaged state at the time of usual stop of the vehicle, and then further automatically shifting down with the direct-coupled clutch in a disengaged state when the accelerator is released.

According to the aforementioned shifting method, it is possible to decrease a shock accompanying a shifting operation by preventing the occurrence of an engagement shock at the time of direct-coupled clutch engagement (ON), thereby imparting no unpleasant feeling to the driver and improving the durability of the power transmission system.

The above and other objects, modes and advantages of the present invention will become apparent to one skilled in the art from the following description of preferred embodiment presented below when read in connection with the accompanying drawings which show, for purpose of illustration, preferred embodiments in accordance with the principle of the present invention.

BRIEF DESCRIPTION OF THE DRAWINGS

FIGS. 4(1), 4(2) and 4(3) show an operation flowchart; and

DESCRIPTION OF THE PREFERRED EMBODIMENT

Figure 1:
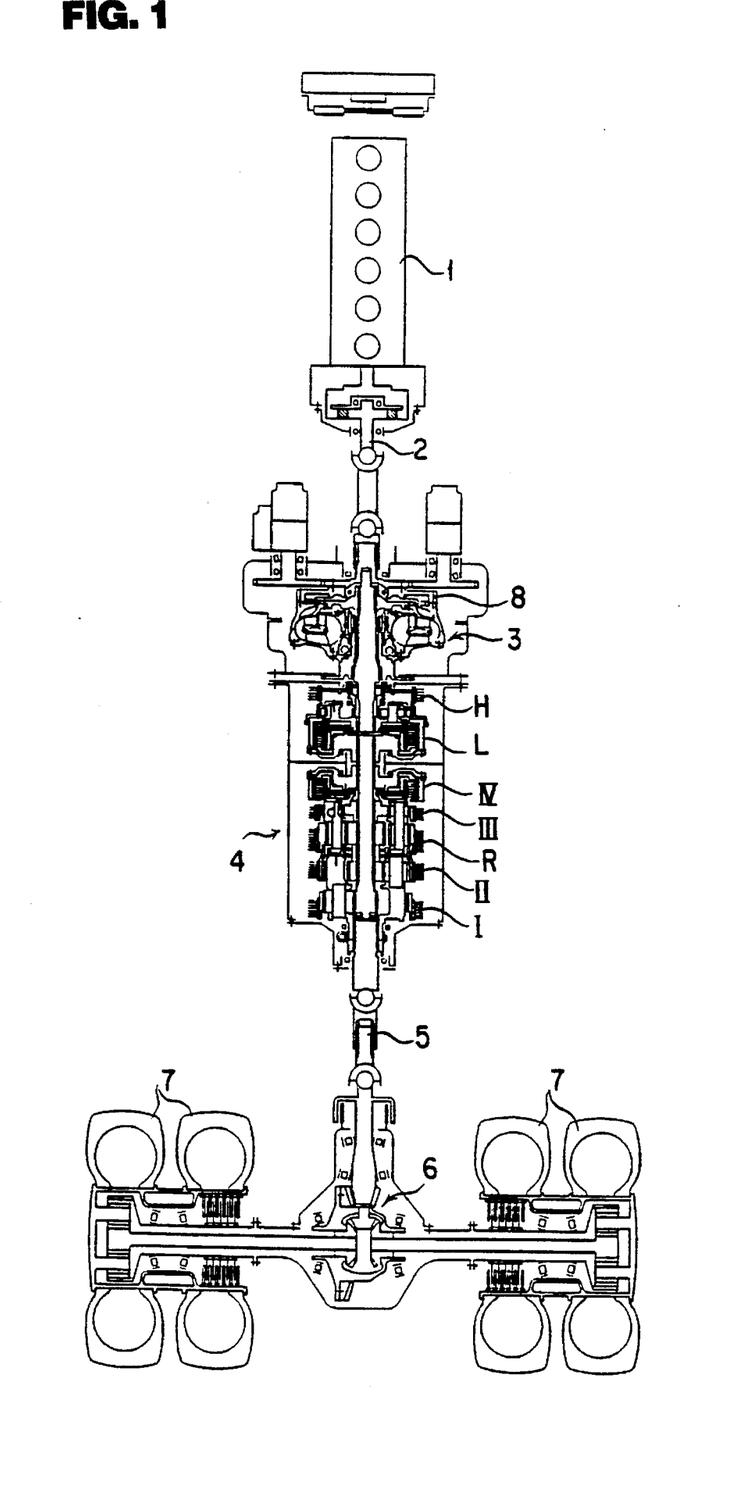
FIG. 1 is a diagrammatic view for explaining the constitution of a power transmission system of a motor vehicle in which a method of controlling the shifting of the present invention is adopted.

As shown in FIG. 1, an output shaft 2 of an engine 1 is connected to the input side of a torque converter 3, and its output side is connected to the input side of the hydraulically-actuated type transmission 4. Also the output side is connected to the right and left driving wheels 7 through a drive shaft 5 and a differential 6.

The above-mentioned torque converter 3 has a direct-coupled clutch or lock-up 8 which connects a pump (impeller) on the input side to a turbine wheel on the output side. The hydraulically-actuated type transmission 4 is equipped with a high-speed hydraulic clutch H, a low-speed hydraulic clutch L, a fourth hydraulic clutch IV, a third hydraulic clutch III, a reverse hydraulic clutch R, a second hydraulic clutch II, and a first hydraulic clutch I. Changes in gear ratio as tabled below, can be achieved by selectively engaging and disengaging these hydraulic clutches.

TABLE

| Hydraulic clutch | Speeds | | | | | | | |
|---|---|---|---|---|---|---|---|---|
| | Forward | | | | | | | Reverse |
| | 1st | 2nd | 3rd | 4th | 5th | 6th | 7th | 1st |
| H | | | ON | | ON | | | |
| L | ON | ON | | ON | | ON | | ON |
| IV | | | | | | ON | ON | |
| III | | | | ON | ON | | | |
| R | | | | | | | | ON |
| II | | ON | ON | | | | | |
| I | ON | | | | | | | |

Figure 2:
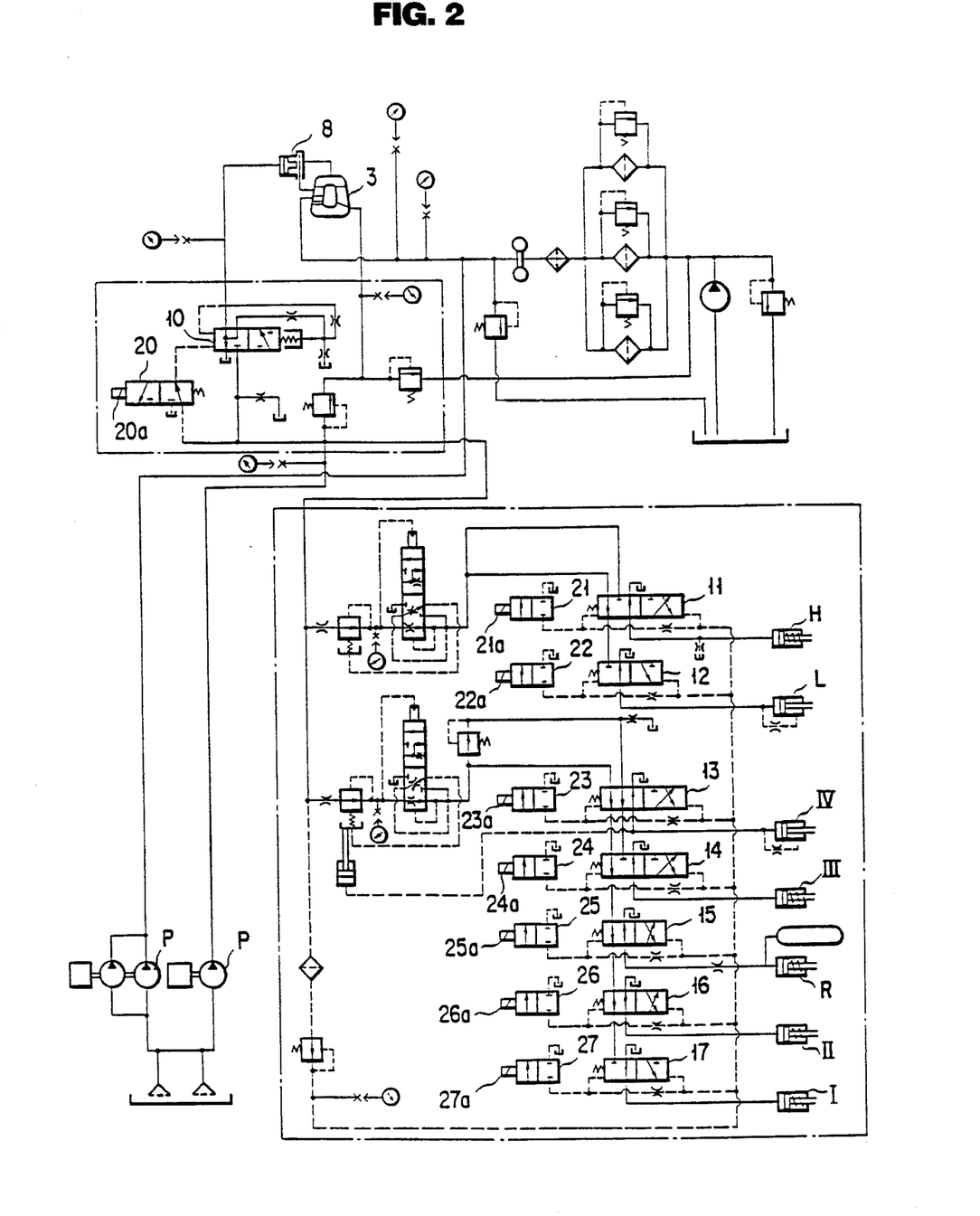
FIG. 2 is a hydraulic circuit diagram of the power transmission system illustrated in FIG. 1.
Figure 3:
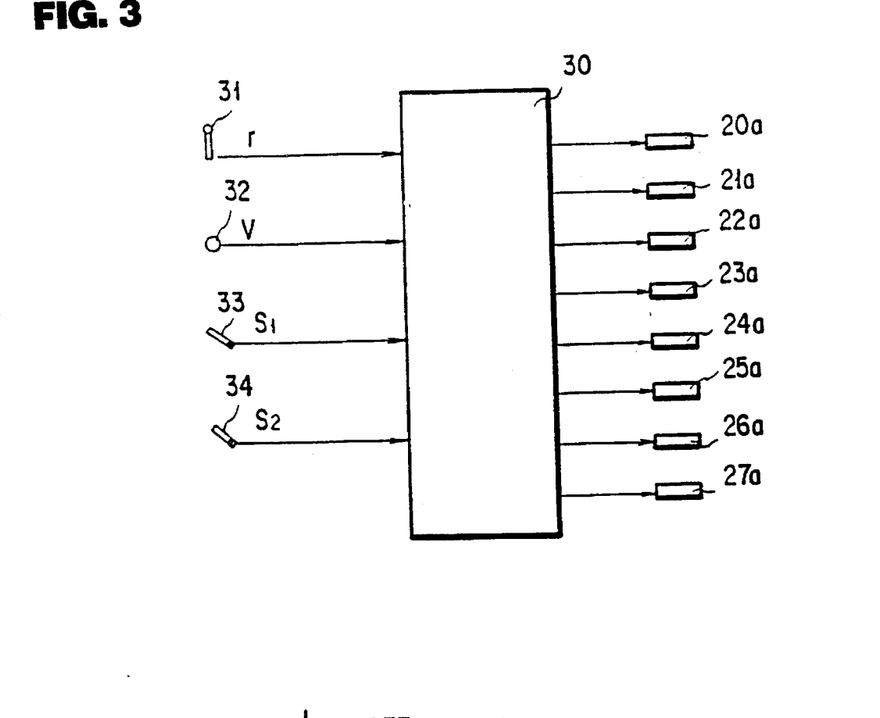
FIG. 3 is a control circuit diagram.
Figure 4A:
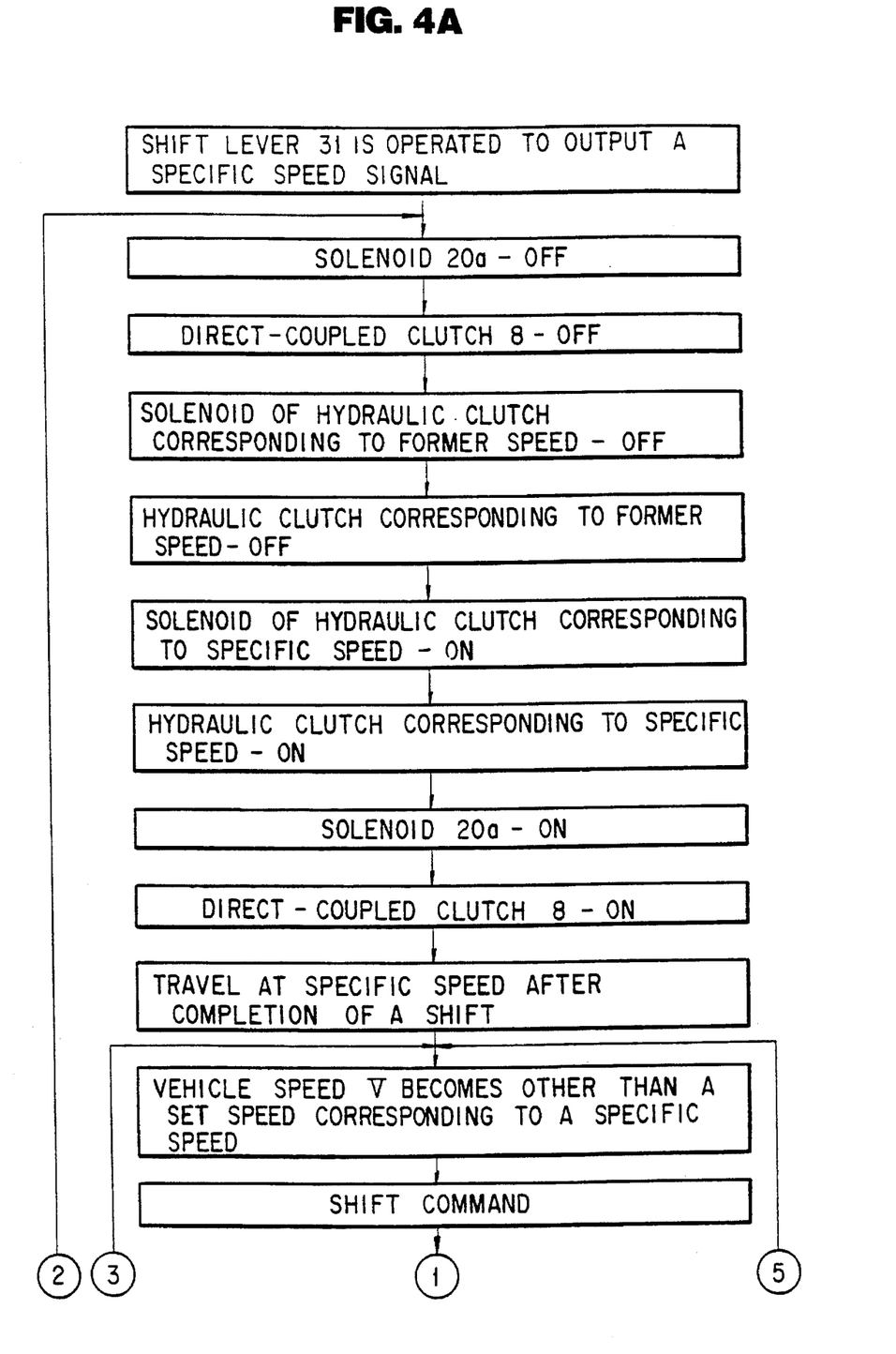
Figure 4B:
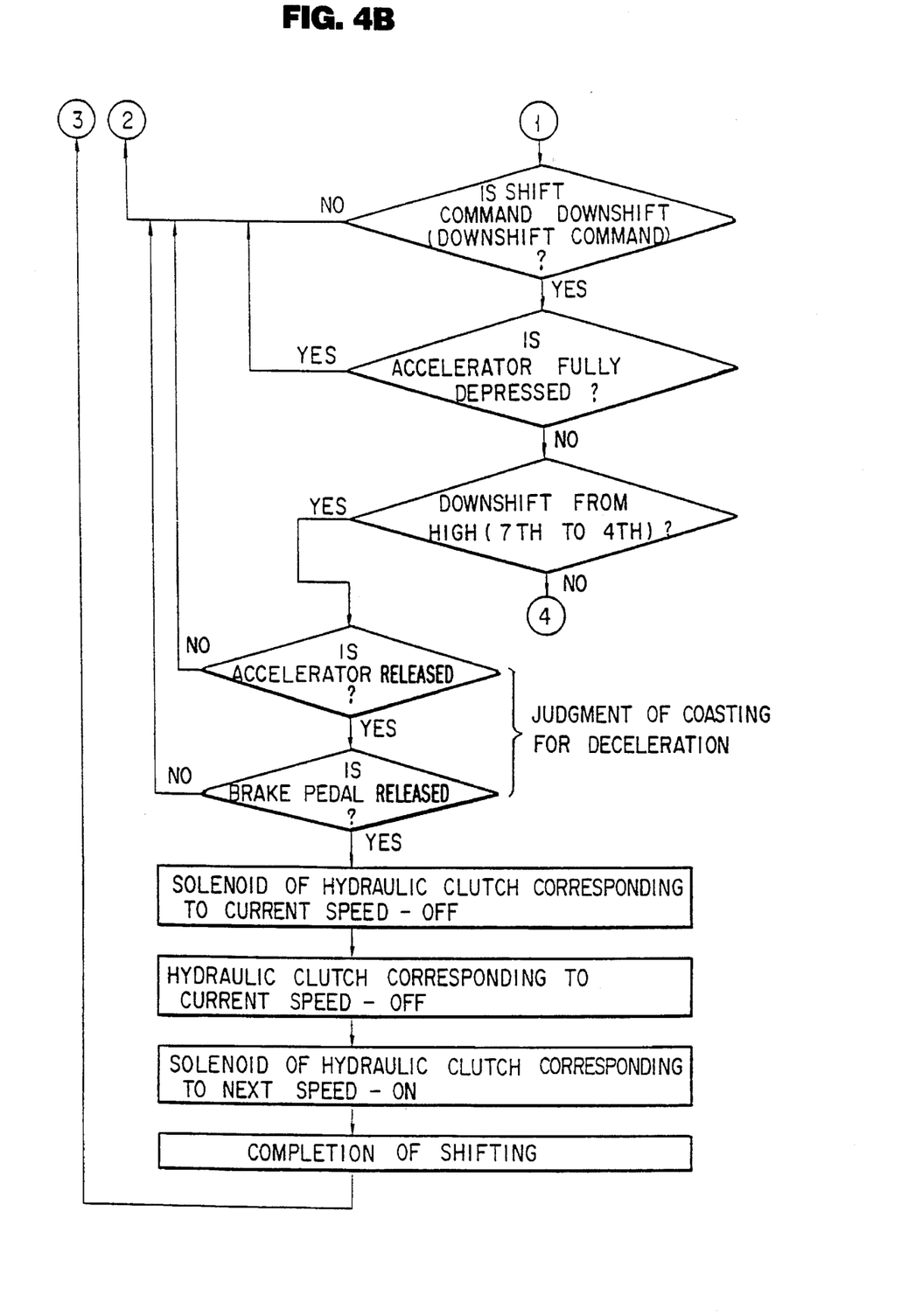
Figure 4C:
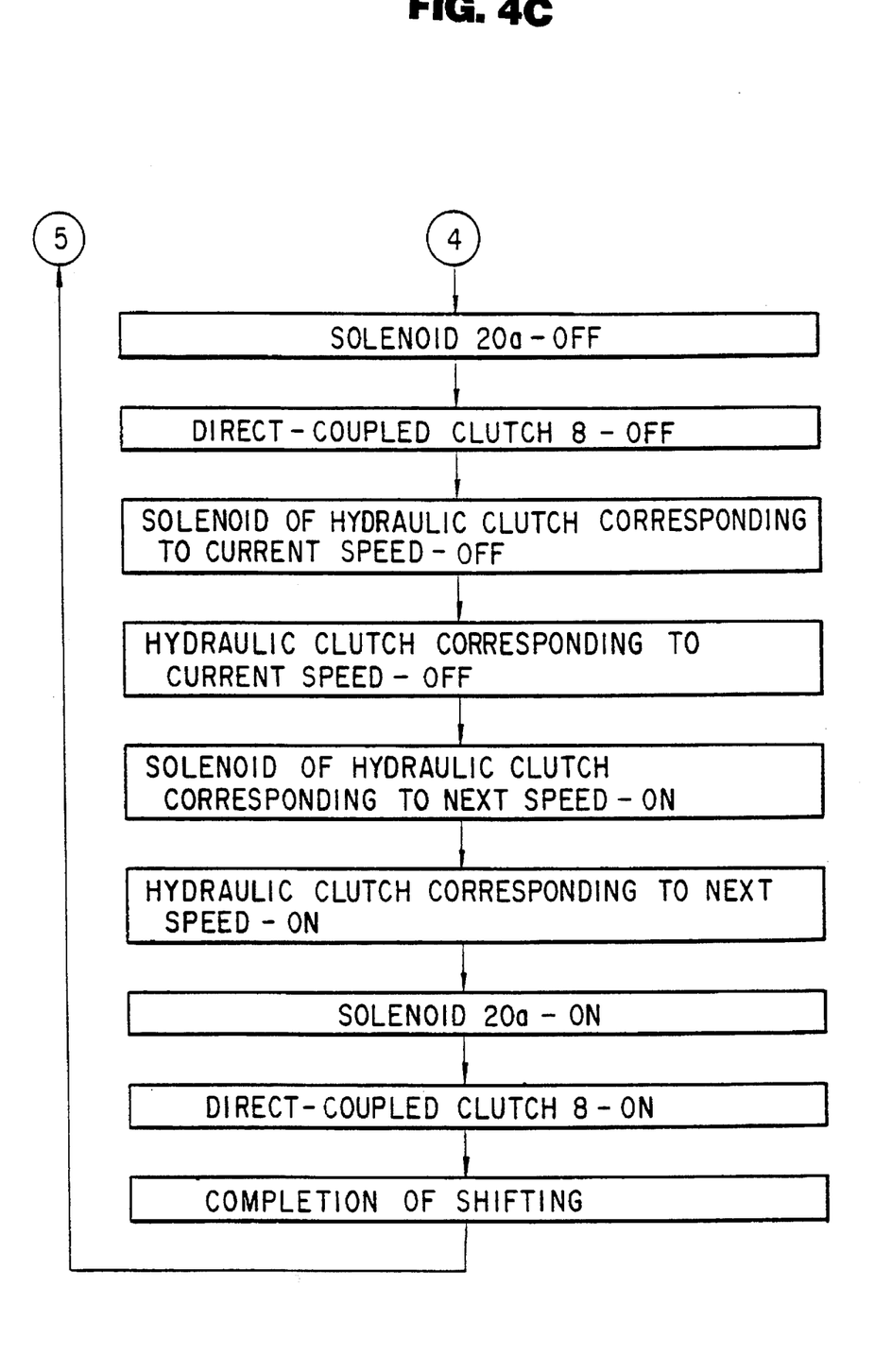

As shown in FIG. 2, the direct-coupled clutch 8 has a direct-coupled clutch valve 10 for controlling the supply of a hydraulic oil from the pump. The above listed and each hydraulic clutches are associated with a high-speed valve 11, a low-speed valve 12, a fourth valve 13, a third valve 14, a reverse valve 15, a second valve 16, and a first valve 17 which control the supply of the hydraulic oil delivered from the pump P. The direct-coupled clutch valve 10 is switched by a first solenoid valve 20. The remaining clutch control valves are switched by means of a second, third, fourth, fifth, sixth, seventh and eighth solenoid valves 21, 22, 23, 24, 25, 26 and 27. These solenoid valves are designed to be operated by solenoids 20a to 27a. These solenoids, when energized, switch these valves for engagement of the direct-coupled clutch valve 10 and hydraulic clutches.

The above-described constitution, known as a prior art, will not be described in detail.

The solenoids 20a to 27a previously stated are controlled by means of a controller 30. To this controller 30 are inputted a gear select signal γ from a shift lever 31, a vehicle speed V from a vehicle speed sensor 32, an accelerator off signal S1 from an accelerator depression sensor 33, and a brake off signal S2 from a brake pedal depression sensor 34. Also, as shown in FIG. 4, the controller 30 controls the solenoids 20a to 27a, thereby controlling shifting operation.

Figure 5A:
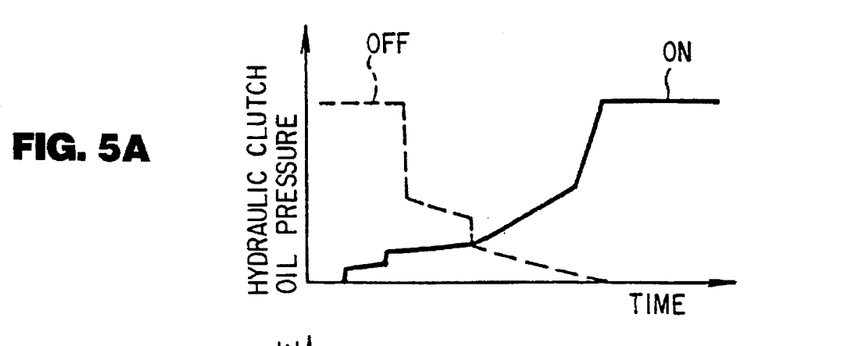
FIGS. 5(A) and 5(B) are graphs showing the relationship between hydraulic pressure changes and the lapse of time in a transmission clutch and a direct-coupled clutch, respectively.
Figure 5B:
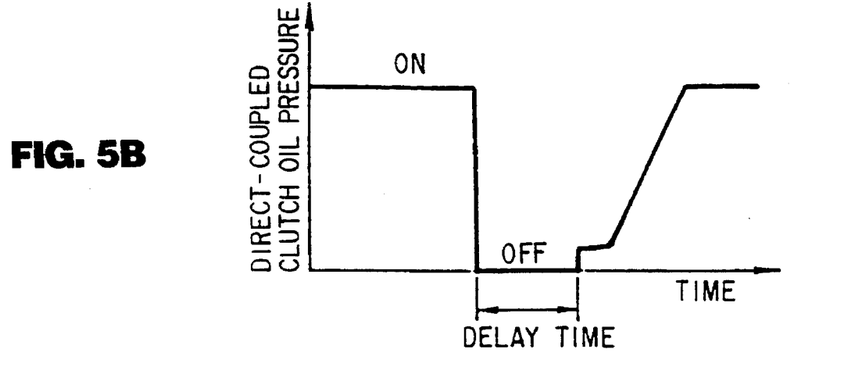

In the flowchart shown in FIG. 4, with the on-off operation of the solenoid 20a, a delay timer is operated upon receiving a shift command, so that the hydraulic pressure at the hydraulic clutch and the hydraulic pressure at the direct-coupled clutch 8 will increase or decrease as shown in FIG. 5.

More specifically, FIG. 4(1) describes an operation in which a shift lever 31 is operated to output a specific speed signal. Solenoid 20a is set to an OFF state. At this time, the direct-coupled clutch 8 (that is, the lock-in clutch 8) is in a released position (that is, an OFF state). Further, the solenoid controlling the hydraulic clutch which corresponds to the former speed is OFF. This in turn causes the hydraulic clutch which corresponds to former speed to be disengaged (OFF). Next the solenoid controlling the hydraulic clutch which corresponds to specific speed is turned on. Then solenoid 20a is turned on. As shown, at this point the direct-coupled clutch 8 is engaged (ON) and the vehicle travels at a specific speed after completion of a shift. After a certain time, the vehicle speed changes from a set speed corresponding to the specific speed. This results in a shift command.

As further shown in FIG. 4(2), it is then determined whether the shift command is a downshift command. If not, the process is suspended until the vehicle speed is found to change from the set speed. If there is a downshift command, it is next determined whether the accelerator is fully depressed. If so, the process is again suspended until the vehicle speed is found to change from the set speed. If the accelerator is not fully depressed, it is determined whether the downshift is from a position in which the high speed hydraulic clutch is engaged ("a downshift from "HIGH""), for example from seventh gear to fourth.

If a downshift from high occurred, the process shown in FIG. 4(3) takes place. The solenoid 20a is tuned off thereby releasing the direct-coupled clutch. Then the solenoid for the hydraulic clutch corresponding to current speed is turned off causing this hydraulic clutch to disengage. Next, the solenoid corresponding to the next speed is turned on causing the hydraulic clutch corresponding to the next speed to engage. Then solenoid 20a is turned on thereby engaging the direct-coupled clutch and completing the shift cycle.

However if it is determined that a downshift from a HIGH state did not occur, it is determined whether the accelerator is released. If not, the process is suspended until the vehicle speed is found to change from the set speed. If so, it is determined whether the brake pedal is released. Again, if not, the process is suspended until the vehicle speed is found to change from the set speed. If the brake pedal is released, the solenoid for the hydraulic clutch corresponding to current speed is tuned off, thereby releasing this hydraulic clutch. Finally, the hydraulic clutch corresponding to the next speed is engaged by turning on its corresponding solenoid, and the shifting process is completed.

That is, when coasting and shifting down for example from any one of the seventh to fourth speeds with both the accelerator and brake pedals released, a downshift is automatically performed with the direct-coupled clutch 8 kept engaged, thus decelerating smoothly within a short time by effectively utilizing the engine brake.

Also, as the vehicle slows toward a stop, a downshift is automatically made once to a lower gear (for example from third to second speed) with the direct-coupled clutch 8 held engaged. Then, with the accelerator released, and with the direct-coupled clutch held in a disengaged state, when disengaged at the time of shifting, until its engagement is required, a downshift is automatically made, thereby preventing the occurrence of an engagement shock when the direct-coupled clutch 8 is engaged.

When a downshift is made into low in the manner described above, the vehicle speed is substantially low, and therefore engine braking is unnecessary. Accordingly, no problem will occur if a downshift is effected with the direct-coupled clutch 8 disengaged.

In case the vehicle speed decreases while the accelerator is fully depressed such as occurs when proceeding up an upgrade, the direct-coupled clutch 8 is disengaged only at the time of shifting and engaged after the completion of the shifting.

What is claimed is:

1. A method of controlling the shifting of a multi-step power transmission which is shiftable between a plurality of transmission speed ratios including a first group of transmission speed ratios resulting from operation of a first frictional engagement means and a second group of transmission speed ratios resulting from operation of a second frictional engagement means, comprising the steps of:

automatically effecting an unforced down-shifting of said transmission from within said first group of transmission speed ratios to a lower transmission speed ratio with a direct-coupled clutch of a torque converter maintained in an engaged state; and automatically effecting a further shifting-down of the transmission from said second group of transmission speed ratios to a lower transmission speed ratio with said direct-coupled clutch maintained in a disengaged state while both of the accelerator and a brake pedal are released.

2. A method for controlling shifting of an automatic power transmission comprising the steps of:

determining a current transmission speed ratio;

detecting a position of a vehicular accelerator;

determining a condition of a lock-up clutch operatively connected with a torque converter, said condition being one of an engaged position and a released position;

detecting a down-shift demand;

effecting a down-shift from the current transmission speed ratio to a lower transmission speed ratio in response to said down-shift demand; and controlling the condition of said lock-up clutch based on the detected current transmission speed ratio and the detected positions of said accelerator and a brake pedal during down-shifting of the transmission;

wherein, during said down-shifting of the transmission, said lock-up clutch is maintained in said engaged position when the current transmission speed ratio and the detected positions of said accelerator satisfy respective predetermined conditions, and said lock-up clutch is maintained in said released condition when said current transmission speed ratio is lower than a predetermined transmission speed ratio and the detected positions of said accelerator and said brake pedal are fully released positions.

3. A method as set forth in claim 2, wherein said respective predetermined conditions are satisfied when said current transmission speed ratio is a transmission speed ratio that results from operation of a first frictional engagement means and when said accelerator is in a fully released position.

4. A method as set forth in claim 3, wherein said lock-up clutch is maintained in said engaged position during down-shifting of the transmission when said brake application is absent.

5. A method as set forth is claim 2, which further comprises the step of detecting vehicle speed, wherein said lock-up clutch is maintained in said engaged position when the vehicle speed is less other than a predetermined speed and said accelerator is in a fully depressed position.

6. A method for controlling shifting of an automatic power transmission between a plurality of speed ratios including a first group of transmission speed ratios resulting from operation of a first frictional engagement means and a second group of transmission speed ratios resulting from operation of a second frictional engagement means, comprising the steps of:

determining a current transmission speed ratio;

detecting a position of a vehicular accelerator;

detecting a position of a brake pedal;

detecting a down-shifting demand;

effecting down-shifting from the current transmission speed ratio to a lower transmission speed ratio in response to said down-shifting demand; and controlling a position of a lock-up clutch, said position being one of an engaged position and a released position, based on said current transmission speed ratio and said positions of said accelerator and said brake pedal during down-shifting of the transmission;

wherein said lock-up clutch is maintained in said engaged position during downshifting when downshifting is initiated from within said first group and, is maintained in said released position during downshifting once the transmission speed ratio is down-shifted to a transmission speed ratio falling within said second group.

7. A method for controlling shifting of a transmission speed ratio of an automatic power transmission between a plurality of speed ratios including a first group of transmission speed ratios resulting from operation of a first frictional engagement means and a second group of transmission speed ratios resulting from operation of a second frictional engagement means, comprising the steps of:

determining a current transmission speed ratio;

detecting a position of a vehicular accelerator;

detecting a position of a brake pedal;

determining a condition of a look-up clutch operatively connected with torque converter, said condition being one of an engaged position and a released position;

detecting a down-shift demand;

effecting down-shift from the current transmission speed ratio to a lower transmission speed ratio in response to said down-shift demand; and controlling the condition of said lock-up clutch based on said current transmission speed ratio and said positions of said accelerator and brake pedal during down-shifting of the transmission;

wherein, said lock-up clutch is maintained at the engaged position during downshifting when downshifting is initiated from a transmission speed ratio falling within said first group and, is maintained at the released position during downshifting when the transmission speed ratio has been down-shifted to one of said second group of transmission speed ratios and said accelerator is depressed.

8. A system for controlling shifting of a transmission speed ratio of an automatic power transmission operatively connected with a torque converter, said torque converter including a lock-up clutch operatively connecting an engine with said automatic power transmission, said system comprising:

means for determining a current transmission speed ratio;

means for detecting a position of a vehicular accelerator;

means for detecting a position of a brake pedal;

means for determining a condition of said lock-up clutch, said condition being one of an engaged position and a released position;

means for detecting a down-shift demand;

means for effecting a down-shift from the current transmission speed ratio to a lower transmission speed ratio in response to said down-shift demand; and means for controlling the condition of said lock-up clutch based on at least one of said detected position of said accelerator and said detected position of the brake pedal during down-shifting of the transmission;

wherein, during down-shifting of the transmission, said lock-up clutch is maintained in said engaged position when both the current transmission speed ratio and the detected positions of said accelerator and said brake pedal satisfy respective predetermined conditions, and said lock-up clutch is maintained in said released condition when neither of said current transmission speed ratio and the detected position of said accelerator satisfy said respective predetermined conditions.

9. A system as set forth in claim 8, wherein said respective predetermined conditions are satisfied when said current transmission speed ratio is a transmission speed ratio that results from operation of a first frictional engagement means and when said accelerator is in a fully released position.

10. A system as set forth in claim 9, wherein said lock-up clutch is maintained in said engaged position during downshifting of the transmission when said brake brake pedal is in a fully released position.

11. A system as set forth is claim 10, which further comprises means for detecting vehicle speed, and wherein said lock-up clutch is placed into said engaged position immediately after completion of a down-shift to a transmission speed ratio that results from operation of a second frictional engagement means when the vehicle speed is less than a predetermined speed and said accelerator is in a fully depressed position.

12. A system for controlling shifting of an automatic power transmission operatively coupled with a torque converter which incorporates a lock-up clutch, said lock-up clutch directly coupling an engine with said automatic power transmission, said system comprising:

means for detecting a vehicular speed;

means for determining a current transmission speed ratio;

means for detecting a position of a vehicular accelerator;

means for detecting a position of a manually operable shift lever;

means for determining a condition of said lock-up clutch, said condition being one of an engaged position and a released position;

means for detecting a down-shift demand which is generated independently of the detected position of said shift lever;

means for effecting a down-shift from the current transmission speed ratio to a lower speed transmission speed ratio in response to a down-shift demand; and means for controlling the condition of said lock-up clutch based on said current transmission speed ratio and said position of said accelerator during down-shifting of the transmission;

wherein, during down-shifting, said lock-up clutch is maintained in said engaged position when the current transmission speed ratio, said position of the accelerator and the vehicle speed satisfy respective predetermined conditions, and said lock-up clutch is maintained in said released position when one of the current transmission speed ratio, said position of the accelerator and the vehicle speed does not satisfy said respective predetermined conditions.

* * * * *